United States Patent
Sidoti et al.

(10) Patent No.: US 11,681,669 B2
(45) Date of Patent: Jun. 20, 2023

(54) METHOD AND SYSTEM FOR CORRELATING MULTIPLE DEVICE ENTRIES WITHIN DOMAIN

(71) Applicant: HCL Technologies Italy S.p.A., Vimodrone (IT)

(72) Inventors: Stefano Sidoti, Rome (IT); Rosario Gangemi, Rome (IT)

(73) Assignee: HCL Technologies Italy S.p.A., Milan (IT)

( * ) Notice: Subject to any disclaimer, the term of this patent is extended or adjusted under 35 U.S.C. 154(b) by 193 days.

(21) Appl. No.: 16/907,574

(22) Filed: Jun. 22, 2020

(65) Prior Publication Data

US 2021/0397592 A1 Dec. 23, 2021

(51) Int. Cl.
*G06F 16/215* (2019.01)
*G06F 16/22* (2019.01)
*G06F 9/445* (2018.01)

(52) U.S. Cl.
CPC ........ *G06F 16/215* (2019.01); *G06F 9/44526* (2013.01); *G06F 16/22* (2019.01)

(58) Field of Classification Search
CPC ........ G06F 16/215; G06F 9/445; G06F 16/22; G06F 16/958
See application file for complete search history.

(56) References Cited

U.S. PATENT DOCUMENTS

| | | | |
|---|---|---|---|
| 7,328,260 B1 | 2/2008 | Muthiyan et al. | |
| 7,756,975 B1* | 7/2010 | Cronk | H04L 41/12 |
| | | | 709/224 |
| 8,296,413 B2 | 10/2012 | Bornhoevd et al. | |
| 8,539,543 B2 | 9/2013 | Schnell et al. | |
| 9,081,747 B1* | 7/2015 | Tabieros | G06F 9/4411 |
| 9,141,779 B2 | 9/2015 | Shen et al. | |
| 9,203,840 B2 | 12/2015 | Spencer et al. | |
| 9,591,027 B2 | 3/2017 | Molloy et al. | |
| 9,680,875 B2 | 6/2017 | Knjazihhin et al. | |
| 2005/0204061 A1* | 9/2005 | Farchmin | G05B 19/0423 |
| | | | 709/245 |
| 2006/0233179 A1* | 10/2006 | Estrada | H04L 29/12018 |
| | | | 370/395.54 |
| 2013/0339548 A1* | 12/2013 | Gopinath | H04L 61/2076 |
| | | | 709/245 |

(Continued)

OTHER PUBLICATIONS

John Wunder, Specification for Asset Identification 1.1.

*Primary Examiner* — Tyler J Torgrimson
*Assistant Examiner* — Maher N Algibhah

(57) ABSTRACT

Method and system for correlating multiple device entries within a domain is disclosed. The method may include receiving a first correlation key comprising a set of device properties associated with a first device from a first plugin. The method may further include comparing the first correlation key with each of a plurality of second correlation keys stored in a device database. The method may further include determining whether a second correlation key from the plurality of second correlation keys in the device database corresponds to the first device, based on the comparing. The method may further include selectively correlating the first device with a second device from the plurality of second devices mapped to the second correlation key in the device database, based on the determining.

17 Claims, 6 Drawing Sheets

(56) References Cited

U.S. PATENT DOCUMENTS

| | | | |
|---|---|---|---|
| 2014/0172837 A1* | 6/2014 | Sommer | H04L 67/22 |
| | | | 709/204 |
| 2014/0266612 A1 | 9/2014 | Marten et al. | |
| 2016/0021485 A1* | 1/2016 | Sallas | H04W 40/02 |
| | | | 455/41.3 |
| 2016/0165409 A1* | 6/2016 | Bulut | H04W 4/06 |
| | | | 715/734 |
| 2016/0269249 A1* | 9/2016 | Maes | G06F 16/22 |
| 2016/0323735 A1* | 11/2016 | Lumbatis | H04W 48/16 |
| 2016/0352614 A1* | 12/2016 | Valencia Lopez | |
| | | | H04L 61/1511 |
| 2017/0245106 A1* | 8/2017 | Connelly | H04W 72/048 |
| 2019/0238952 A1 | 8/2019 | Boskovich | |
| 2019/0306115 A1* | 10/2019 | Nishizaki | G06F 3/1288 |

* cited by examiner

METHOD AND SYSTEM FOR CORRELATING MULTIPLE DEVICE ENTRIES WITHIN DOMAIN

TECHNICAL FIELD

The present disclosure relates generally to duplicate entries of a device in a domain, and more particularly to method and system for correlating multiple device entries within a domain.

BACKGROUND

Cloud computing has enabled remote access of data and high-speed processing for multiple devices. A device, which may be a physical device or a virtual device, (for example, a smartphone, a laptop, a computer, etc.) may be running within a domain and may be connected to a server through the domain. A domain may be a cloud platform, for example, AMAZON® WEB SERVICE (AWS®), and a device within the domain may have one or more plugins installed therein or enabled for the device. A plugin may be an Application Programming Interface (API) that provides an interface between the device in the domain and the server. Thus, the plugin may share information related to the device with the server. A plugin, for example, may be an AWS cloud plugin or a WINDOWS®/MAC® management API.

In big organizations, a large number of devices may be required to be monitored via a single interface on a remote server that is communicatively coupled to the devices via plugins installed or enabled on each of the devices. Since multiple plugins may be installed on a single device and the remote server may be connected to the device through each of these multiple plugins, the interface may represent the single device as multiple device entries. This may result in an inaccurate representation of the computational resources of the organization, thereby leading to erroneous monitoring of devices.

Some of the conventional techniques use probabilistic algorithms to determine a score for two or more device entries on the server side. If the determined score exceeds a threshold score, the two or more device entries are correlated. In other words, it is determined that the two or more device entries are multiple representations of a single device. However, such conventional techniques lack accuracy and efficiency, as correlation achieved by such techniques require customer confirmation for correctness, a need for manual tuning, and subsequent correction.

There is, therefore, a need for method and system for efficiently managing and correlating multiple device entries within a domain.

SUMMARY

In one embodiment, a method for correlating multiple device entries within a domain is disclosed. In one example, the method may include receiving, by a correlation device, a first correlation key including a set of device properties associated with a first device from a first plugin. The first plugin corresponds to a first subdomain from a plurality of subdomains within the domain. The first set of device properties includes a unique device property that is unique to the first device. The method may further include comparing, by the correlation device, the first correlation key with each of a plurality of second correlation keys stored in a device database. The plurality of second correlation keys is received from a plurality of second plugins for a plurality of second devices. Each of the plurality of second correlation keys corresponds to one of the plurality of second plugins and a unique second device from the plurality of second devices. The method may further include determining, by the correlation device, whether a second correlation key from the plurality of second correlation keys in the device database corresponds to the first device, based on the comparing. The method may further include selectively correlating, by the correlation device, the first device with a second device from the plurality of second devices mapped to the second correlation key in the device database, based on the determining.

In another embodiment, a system for correlating multiple device entries within a domain is disclosed. In one example, the system may include a processor, and a computer-readable medium communicatively coupled to the processor. The computer-readable medium may store processor-executable instructions, which when executed by the processor, may cause the processor to receive a first correlation key including a set of device properties associated with a first device from a first plugin. The first plugin corresponds to a first subdomain from a plurality of subdomains within the domain. The first set of device properties includes a unique device property that is unique to the first device. The stored processor-executable instructions, on execution, may further cause the processor to compare the first correlation key with each of a plurality of second correlation keys stored in a device database. The plurality of second correlation keys is received from a plurality of second plugins for a plurality of second devices. Each of the plurality of second correlation keys corresponds to one of the plurality of second plugins and a unique second device from the plurality of second devices. The stored processor-executable instructions, on execution, may further cause the processor to determine whether a second correlation key from the plurality of second correlation keys in the device database corresponds to the first device, based on the comparing. The stored processor-executable instructions, on execution, may further cause the processor to selectively correlate the first device with a second device from the plurality of second devices mapped to the second correlation key in the device database, based on the determining.

In one embodiment, a non-transitory computer-readable medium storing computer-executable instructions for correlating multiple device entries within a domain is disclosed. In one example, the stored instructions, when executed by a processor, may cause the processor to perform operations including receiving a first correlation key including a set of device properties associated with a first device from a first plugin. The first plugin corresponds to a first subdomain from a plurality of subdomains within the domain. The first set of device properties includes a unique device property that is unique to the first device. The operations may further include comparing the first correlation key with each of a plurality of second correlation keys stored in a device database. The plurality of second correlation keys is received from a plurality of second plugins for a plurality of second devices. Each of the plurality of second correlation keys corresponds to one of the plurality of second plugins and a unique second device from the plurality of second devices. The operations may further include determining whether a second correlation key from the plurality of second correlation keys in the device database corresponds to the first device, based on the comparing. The operations may further include selectively correlating the first device with a second device from the plurality of second devices mapped to the second correlation key in the device database, based on the determining.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
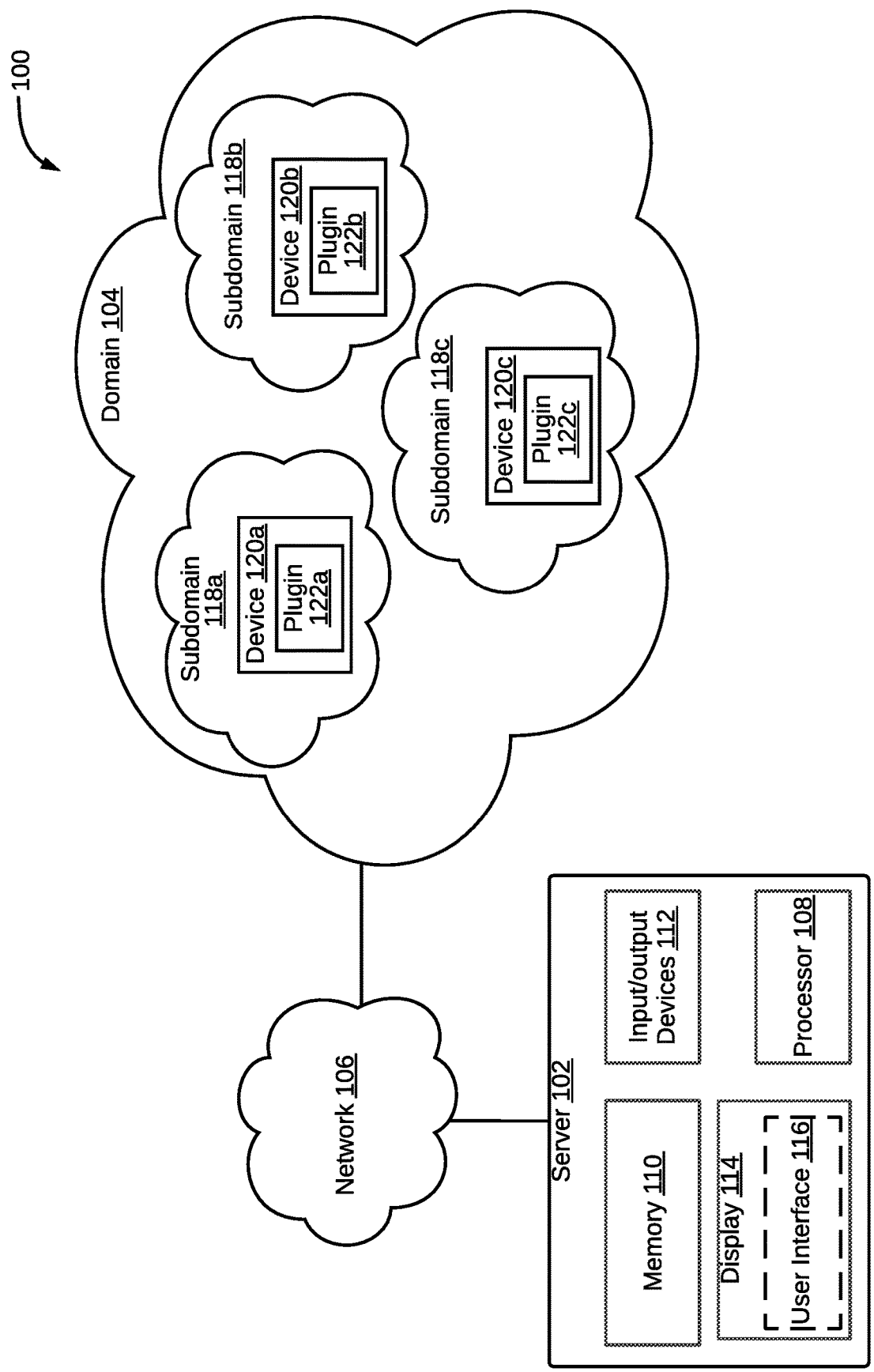
FIG. 1 is a block diagram of an exemplary system for correlating multiple device entries within a domain, in accordance with some embodiments.

Referring now to FIG. 1, an exemplary system 100 for correlating multiple device entries within a domain is illustrated, in accordance with some embodiments. The system 100 may include a server 102 that is communicatively coupled with at least one domain (for example, a domain 104) over a network 106. The server 102 may implement a correlation device to correlate multiple device entries within the domain 104. Alternatively, the server 102 may be replaced by the correlation device. The server 102 may include a processor 108, a memory 110, and Input/Output (I/O) devices 112, and a display 114. The memory 110 may store instructions that, when executed by the processor 108, cause the processor 108 to correlate multiple device entries within the domain 104. The server may also include a display 114, which may further include a User Interface (UI) 116 that may be used to display intermediate and final results of correlating multiple device entries to a user. Additionally, the user may also provide inputs to the server 102 via the UI 116. The domain 104 may be a cloud computing platform, for example, MICROSOFT® AZURE®, AMAZON® WEB SERVICES (AWS®), GOOGLE CLOUD®, or the like.

The domain 104 may further include a plurality of subdomains, such that each of the plurality of subdomains corresponds to a plugin. A plugin may be an Application Programming Interface (API) that provides an interface between a plurality of devices 120 in the domain 104 and the server 102. Thus, a plugin may share information related to one of the plurality of the devices 120 with the server 102. A plugin, for example, may be an AWS® cloud plugin or a WINDOWS®/MAC® management API. Each of the plurality of devices 120 may be a physical device or a virtual device. By way of an example, a device may be a smartphone (an android device, an apple iOS device, or the like), a laptop, a desktop, a netbook, a tablet, or the like. In some embodiments, the plurality of devices 120 may include a device 120a that may have a plugin 122a installed therein, a device 120b that may have a plugin 122b installed therein, and a device 120c that may have a plugin 122c installed therein. The device 120a and the plugin 122a may form a subdomain 118a, the device 120b and the plugin 122b may form a subdomain 118b, while the device 120c and the plugin 122c may form a subdomain 118c.

The device 120a and the device 120b may correspond to a single device existing in different subdomains by way of being connected to the server 102 through different plugins (i.e., plugin 122a and 122b). To establish that the device 120a and the device 120b correspond to a single device, the server 104 may compare a first correlation key corresponding to the device 120a with a second correlation key corresponding to the device 120b. The first correlation key may be generated by the plugin 122a and may include a set of device properties associated with the device 120a. Similarly, the second correlation key may be generated by the plugin 122b and may include a set of device properties associated with the device 120b. When at least one device property of the first correlation key matches with at least one device property of the second correlation key, the server 102 may establish that the device 120a and the device 120b correspond to a single device that are connected through different plugins in different subdomains. In an embodiment, one of the different plugins may be a master plugin (not shown in figure) and each of the remaining plugins may be connected with the master plugin. In this case, the plurality of plugins are arranged in star schema. In another embodiment, the plurality of plugins are arranged in a ring schema, where a master plugin is not present.

In a similar manner, the device 120c and the device 120a may correspond to two different devices in the domain 104. To establish this, the server 104 may compare a third correlation key corresponding to the device 120c with the first correlation key. The third correlation key may be generated by the plugin 122c and may include a set of device properties associated with the device 120c. When none of the device properties of the third correlation key matches with a device property of the first correlation key, the server 102 determines that the device 120c is different from the device 120a. This is further described in greater detail in conjunction with FIG. 2 to FIG. 6.

Figure 2:
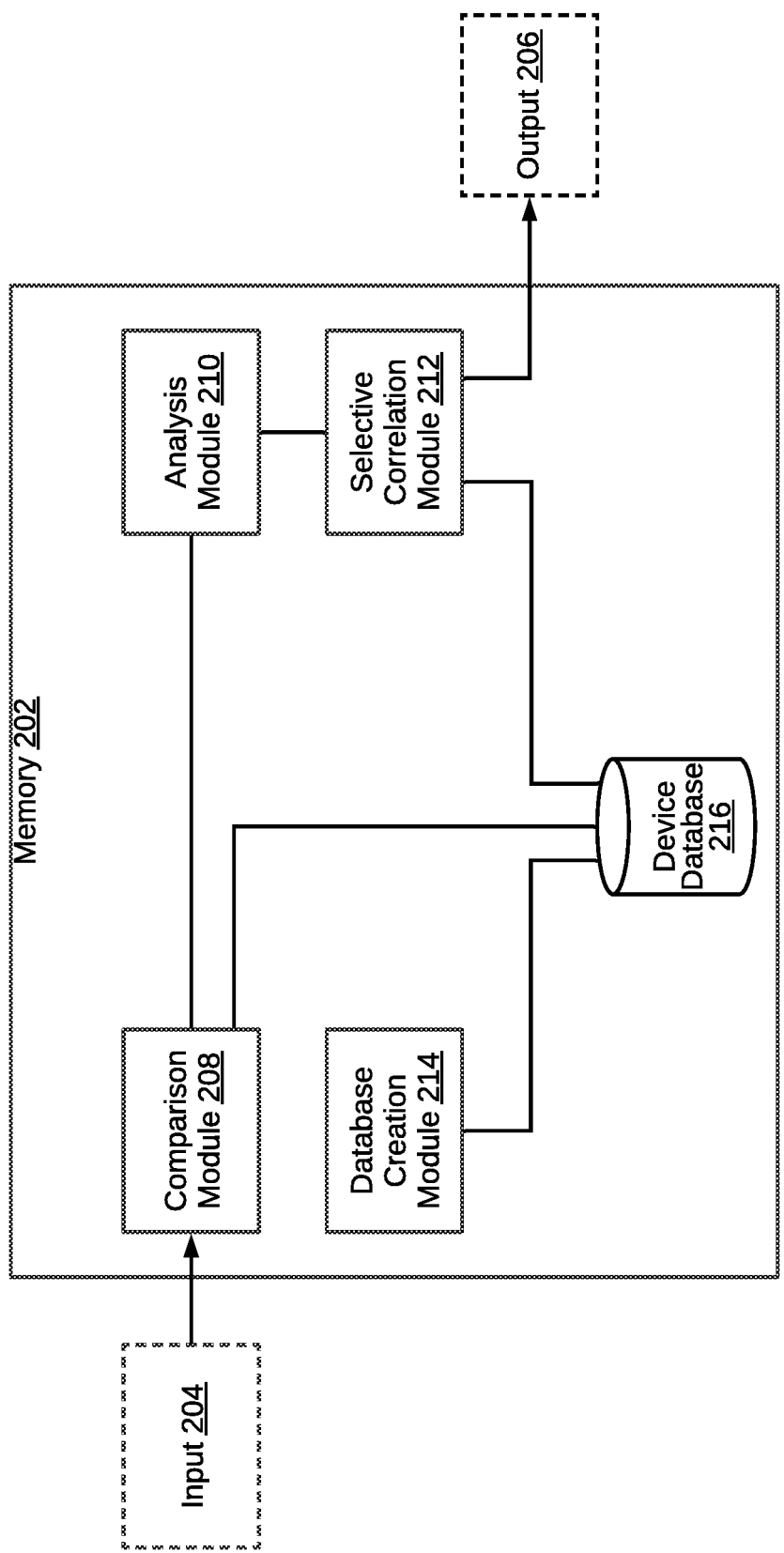
FIG. 2 is a functional block diagram of various modules within a memory of a server configured to correlate multiple device entries within a domain, in accordance with some embodiments.

Referring now to FIG. 2, a functional block diagram of various modules within the memory 202 of a server configured to correlate multiple device entries within a domain is illustrated, in accordance with some embodiments. The memory 202 may receive an input 204 and may provide an output 206. In some embodiments, the memory 202 may be analogous to the memory 110 of the server 102 and thus may be within the server 102. The memory 202 may include a comparison module 208, an analysis module 210, a selective correlation module 212, a database creation module 214, and a device database 216.

The comparison module 208 may receive the input 204 from a plurality of plugins in a domain (for example, the domain 104). The input 204, for example, may include a first correlation key received from a first plugin (for example, the plugin 122a) and may include a set of device properties associated with a first device (for example, the device 120a. The first plugin may correspond to the first subdomain (for example, the subdomain 118a) from a plurality of subdomains within the domain 104. It may be noted that the first set of device properties may include a unique device property that is unique to the first device (for example, the device 120a). A unique device property associated with a device, for example, may include, but is not limited to a Virtual machine Identifier (VID), a Media Access Control (MAC) address, an International Mobile Equipment Identity (IMEI) number, a Universally Unique Identifier (UUID) in a MAC OS subdomain, any combination of the hardware properties already listed.

When the comparison module 208 receives the first correlation key, the comparison module 208 may access a plurality of second correlation keys stored in the device database 216. The plurality of second correlation keys, for example, may include correlation keys associated with the device 120b and the device 120c. The comparison module 208 may then compare the first correlation key with each of the plurality of second correlation keys stored in the device database 216. It may be noted that the plurality of second correlation keys may be received from a plurality of second plugins for a plurality of second devices. Further, each of the plurality of second correlation keys may correspond to one of the plurality of second plugins and a unique second device from the plurality of second devices. In other words, a second correlation key may correspond to a unique second device. For example, the correlation key received from the plugin 122b corresponds to the device 120b, while the correlation key received from the plugin 122c corresponds to the device 120c. In an embodiment, the comparison module 208 may match the unique device property in the first correlation key with unique device properties in each of the plurality of second correlation keys. It may be apparent to a person skilled in the art that the device database 216 may be created based on the iterative matching of correlation keys performed by the comparison module 208.

The comparison module 208 may share results of the comparison between the first correlation key and each of the plurality of second correlation keys with the analysis module 210. Based on the shared results, the analysis module 210 may determine whether a second correlation key from the plurality of second correlation keys in the device database 216 corresponds to the first device. This may be repeated for each of the plurality of second correlation keys in the device database 216. In an exemplary scenario, the analysis module 210 may establish that the second correlation key corresponds to the first device, when the unique device property in the first correlation key matches with a unique device property in the second correlation key. By way of an example and referring back to FIG. 1, the correlation key received from the plugin 122b that corresponds to the device 120b and the correlation key received from the plugin 122c that corresponds to the device 120c may already be stored in the device database 216. When the correlation key is received from the plugin 122a, it is compared with the correlation key that corresponds to the device 120b and the correlation key that corresponds to the device 120b in the device database 216. A unique device property of the correlation key received from the plugin 122a may match with a unique device property of the correlation key that corresponds to the device 120b. Based on this, the analysis module 210 may establish that that the device 120a is same as the device 120b.

In another exemplary scenario, the analysis module 210 may establish that the second correlation key does not correspond to the first device, when the unique device property in the first correlation key does not match with the unique device property in the second correlation key. In continuation of the example above, when the correlation key received from the plugin 122a is compared with the correlation key that corresponds to the device 120c, a unique device property of the correlation key received from the plugin 122a may not match with a unique device property of the correlation key that corresponds to the device 120c. Based on this, the analysis module 210 may establish that that the device 120a is different from the device 120c.

The database creation module 214 may create the device database 216, which may include the plurality of second correlation keys. In an embodiment, the device database 216 may include the plurality of second correlation keys in a tabular form. As explained earlier, each of the plurality of second correlation keys may be mapped to a unique second device of the plurality of second devices and a second plugin of the plurality of second plugins. In some embodiments, the database creation module 214 may receive a second correlation key of the plurality of second correlation keys from a second plugin of the plurality of second plugins. For example, a correlation key shared by the plugin 122b. It may be noted that the second correlation key may be sent by the second plugin on discovering a second device of the plurality of second devices. The second correlation key may be associated with the second device. For example, the plugin 122b shares the correlation key on discovering the device 120b, such that, the correlation key is associated with the device 120b. Further, the database creation module 214 may store the second correlation key in the device database 216. Additionally, the database creation module 214 may map the second correlation key with the second plugin and the second device in the device database 216. In continuation of the above example, the database creation module 214 may map the correlation key shared by the plugin 122b, the plugin 122b, and the device 120b in the device database 216.

The result of analysis performed by the analysis module 210 may be sent to the selective correlation module 212. As discussed before, in one scenario, the analysis module 210 may establish that the second correlation key from the plurality of second correlation keys in the device database 216 corresponds to the first device. For example, the analysis module 210 may establish that the correlation key received from the plugin 122b corresponds to the device 120a. In this case, the selective correlation module 212 may correlate the first device with the second device from the plurality of second devices mapped to the second correlation key in the device database 216. It may be noted that, in this case, the second device is established as a representation of the first device in a second subdomain from the plurality of subdomains. In other words, the first device and the second device are the same device. In continuation of the above example, the selective correlation module 212 may correlate the device 120a with the device 120b in the device database 216, as the devices 120a and device 120b are dual representation of a single device. This resolves multiplicity of device entries in the domain 104.

In another scenario, when the analysis module 210 establishes that the second correlation key does not correspond to the first device, the selective correlation module 212 may store the first correlation key in the device database 216. For example, the analysis module 210 may establish that neither the correlation key received from the plugin 122b nor the correlation key received from the plugin 122c corresponds to the device 120a. Further, the selective correlation module 212 may create a mapping of the first correlation key with the first device and the first plugin without correlating it with the second correlation key. Further, the selective correlation module 212 may mark the first device as uncorrelated with each of the plurality of second devices included in the device database 216. This means that an alternate representation of the first device in the remaining plurality of subdomains is not currently discovered. For example, the selective correlation module 212 may create a mapping of the correlation key received from the plugin 122a, the plugin 122a, and the device 120a.

In some embodiments, correlation results may be stored in the device database 216. The correlation results may include selective correlation of the first device with the second device from the plurality of second devices mapped to the second correlation key in the device database 216. Further, the correlation results may be provided as the output 206. In an exemplary scenario, when the analysis module 210 establishes that the second correlation key corresponds to the first device, the output 206 may include representing the first device and the second device as a single device entry via the UI 116. In another exemplary scenario, when the analysis module 210 establishes that the second correlation key does not correspond to the first device, the output 206 may include representing the first device as a new device entry in the device database 216.

It should be noted that all such aforementioned modules 208-216 may be represented as a single module or a combination of different modules. Further, as will be appreciated by those skilled in the art, each of the modules 208-216 may reside, in whole or in parts, on one device or multiple devices in communication with each other. In some embodiments, each of the modules 208-216 may be implemented as dedicated hardware circuit comprising custom application-specific integrated circuit (ASIC) or gate arrays, off-the-shelf semiconductors such as logic chips, transistors, or other discrete components. Each of the modules 208-216 may also be implemented in a programmable hardware device such as a field programmable gate array (FPGA), programmable array logic, programmable logic device, and so forth. Alternatively, each of the modules 208-216 may be implemented in software for execution by various types of processors (e.g., processor 108). An identified module of executable code may, for instance, include one or more physical or logical blocks of computer instructions which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for correlating multiple device entries within a domain. For example, the exemplary system 100 and the associated server 102 may correlate multiple device entries within a domain by the processes discussed herein. In particular, as will be appreciated by those of ordinary skill in the art, control logic and/or automated routines for performing the techniques and steps described herein may be implemented by the system 100 and the associated server 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
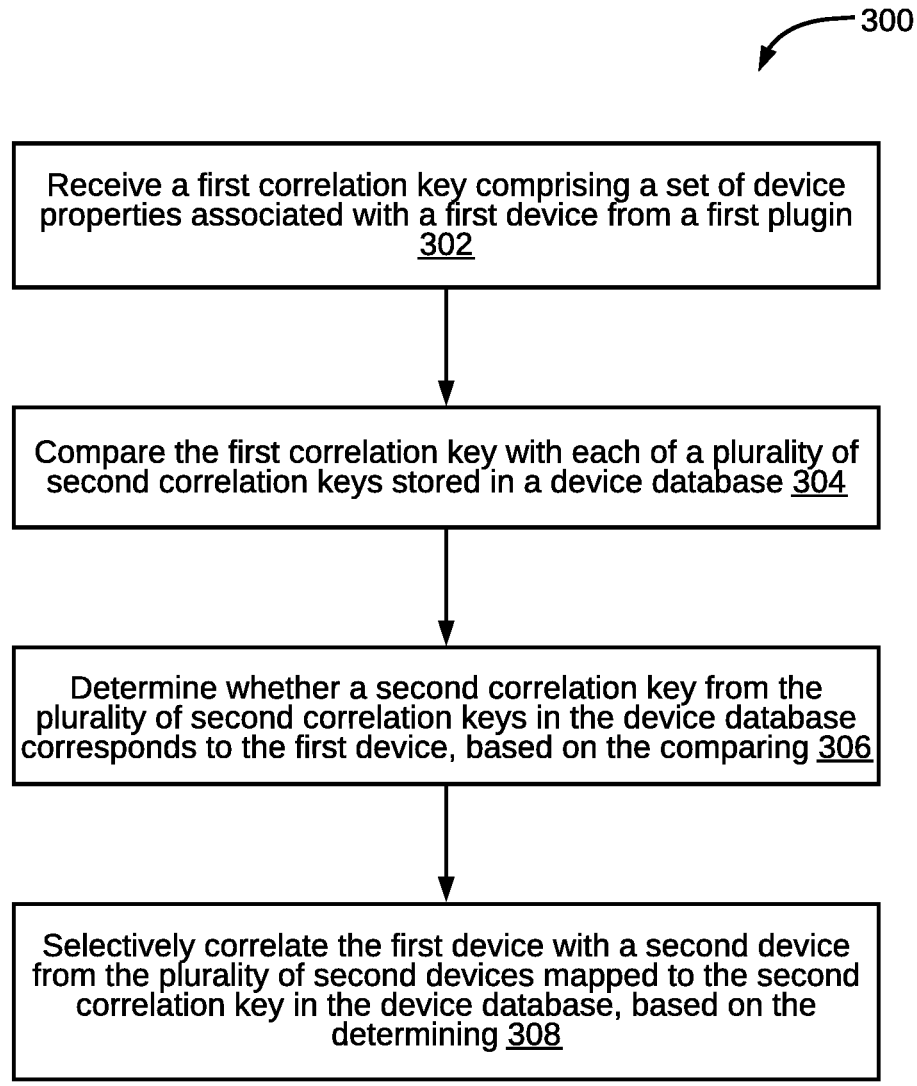
FIG. 3 is a flow diagram of an exemplary control logic for correlating multiple device entries within a domain, in accordance with some embodiments.

Referring now to FIG. 3, an exemplary control logic 300 for correlating multiple device entries within a domain is depicted via a flow chart, in accordance with some embodiments. In an embodiment, the control logic 300 may be executed by a system, such as the system 100 or the server 102. By way of an example, the domain may be the domain 104 of the system 100. The control logic 300 may include receiving a first correlation key including a set of device properties associated with a first device (for example, the device 120a) from a first plugin (for example, the first plugin 122a), at step 302. It may be noted that the first plugin may correspond to a first subdomain (such as, the subdomain 118a) from a plurality of subdomains within the domain 104. The first set of device properties may include a unique device property that is unique to the first device. A unique device property associated with a device, for example, may include, but is not limited to a VID, a MAC address, or an IMEI number.

Further, the control logic 300 may include comparing the first correlation key with each of a plurality of second correlation keys stored in the device database 216, at step 304. In an embodiment, the plurality of second correlation keys is received from a plurality of second plugins for a plurality of second devices. It may be noted that each of the plurality of second correlation keys may correspond to one of the plurality of second plugins and a unique second device from the plurality of second devices. This has already explained in detail in conjunction with FIG. 2. Further, the control logic 300 may include determining whether a second correlation key from the plurality of second correlation keys in the device database 216 corresponds to the first device, based on the comparing, at step 306. Further, the control logic 300 may include selectively correlating the first device with a second device (for example, the device 120b) from the plurality of second devices mapped to the second correlation key in the device database 216, based on the determining, at step 308. This has already explained in detail in conjunction with FIG. 2.

Figure 4:
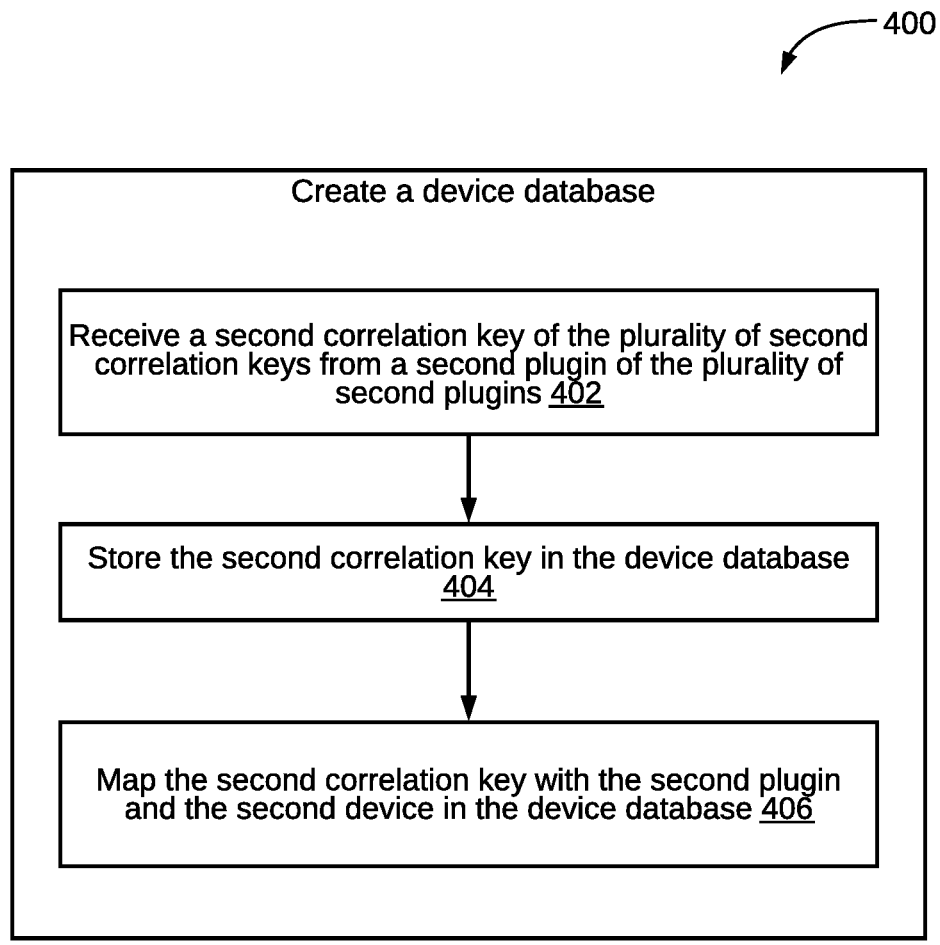
FIG. 4 is a flow diagram of an exemplary control logic for creating a device database including a plurality of second correlation keys, in accordance with some embodiments.

Referring now to FIG. 4, an exemplary control logic 400 for creating a device database including a plurality of second correlation keys is depicted via a flowchart, in accordance with some embodiments. The device database may be analogous to the device database 216 of the system 200. In an embodiment, the control logic 400 may be executed before the control logic 300. It may be noted that each of the plurality of second correlation keys in the device database 216 may be mapped to a unique second device (for example, the device 120c) of the plurality of second devices and a second plugin (for example, the plugin 122c) of the plurality of second plugins. The control logic 400 may include receiving a second correlation key of the plurality of second correlation keys from the second plugin of the plurality of second plugins, at step 402. The second correlation key may be sent by the second plugin on discovering a second device of the plurality of second devices. It may be noted that the second correlation key is associated with the second device. This has already been explained in detail in conjunction with FIG. 2. Further, the control logic 400 may include storing the second correlation key in the device database 216, at step 404. Further, the control logic 400 may include mapping the second correlation key with the second plugin and the second device in the device database 216, at step 406. This has already been explained in detail in conjunction with FIG. 2.

Figure 5:
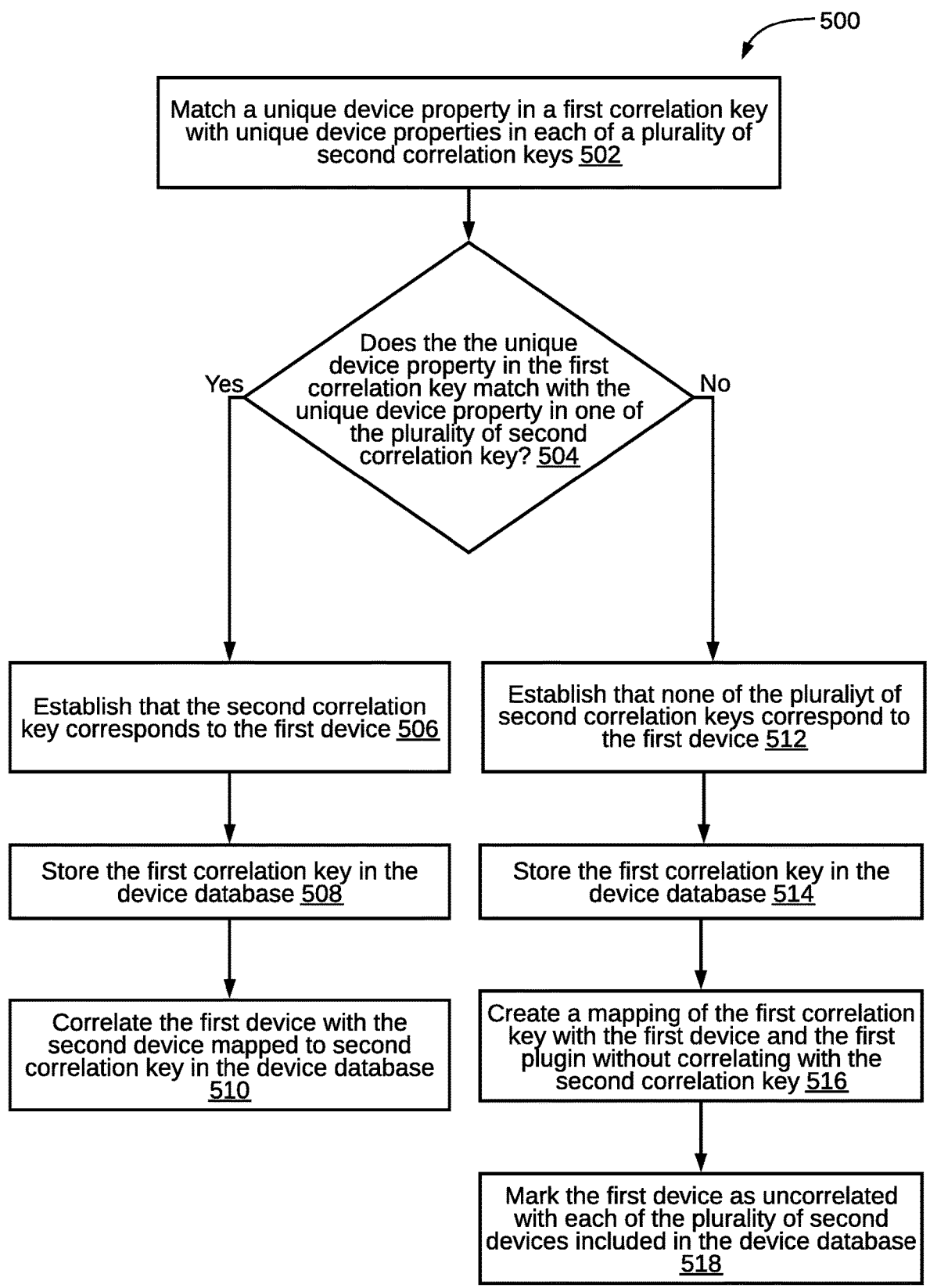
FIG. 5 is a flow diagram of a detailed exemplary control logic for correlating multiple device entries within a domain, in accordance with some embodiments.

Referring now to FIG. 5, a detailed exemplary control logic 500 for correlating multiple device entries within a domain is depicted via a flowchart, in accordance with some embodiments. By way of an example, the domain may be the domain 104. The domain 104 includes the subdomain 118*a*, the subdomain 118*b*, and the subdomain 118*c*. Further, in the subdomain 118*a* the device 120*a* includes the first plugin 122*a*, in the subdomain 118*b* the device 120*b* includes the first plugin 122*b*, and in the subdomain 118*c* the device 120*c* includes the first plugin 122*c*. A correlation key associated with the device 120*a* is shared by the plugin 122*a* with the server 102 through the network 106. Similarly, a correlation key associated with the device 120*b* is shared by the plugin 122*b* with the server 102 and a correlation key associated with the device 120*c* is shared by the plugin 122*c* with the server 102. It may be noted that the correlation keys associated with devices 120*b* and 120*c* may already be stored in the device database 216 and the correlation key associated with the device 120*a* may be newly received.

The control logic 500 may include, at step 502, matching a unique device property in a first correlation key (for example, the correlation key shared by the plugin 122*a*) with unique device properties in each of the plurality of second correlation keys (for example, the correlation keys shared by the plugins 122*b* and 122*c*). Further, at step 504, a check is performed to determine whether the unique device property in the first correlation key matches with a unique device property in one of the plurality of second correlation keys or not. For example, the unique device property in the correlation key shared by the plugin 122*a* is matched with a unique device property in each of the correlation keys shared by the plugins 122*b* and 122*c*.

If the unique device property in the first correlation key matches with a unique device property in a second correlation key, at step 506, correspondence of the second correlation key to the first device is established. For example, the unique device property in the correlation key shared by plugin 122*a* may match with the unique device property in the correlation key shared by the plugin 122*b*. Thus, it may be established that the correlation key shared by the plugin 122*b* corresponds to the device 120*a*. Further, at step 508, the first correlation key is stored in the device database 216. Thereafter, at step 510, the first device is correlated with the second device mapped to second correlation key in the device database 216. It may be noted that the second device is a representation of the first device in a second subdomain from the plurality of subdomains. For example, the device 120*a* may be correlated with the device 120*b*, which is a representation of the first device in the subdomain 118*b*.

Referring back to step 504, if the unique device property in the first correlation key does not match with a unique device property in any second correlation key from the plurality of second correlation keys, at step 512, an absence of correspondence of none of the plurality of second correlation keys to the first device is established. Further, at step 514, the first correlation key is stored in the device database 216. At step 516, a mapping of the first correlation key with the first device and the first plugin is created without correlating with any of the plurality of second correlation keys in the device database 216. For example, a mapping of the correlation key shared by the plugin 122*a*, the plugin 122*a*, and the device 120*a* is created in the device database 216. At step 518, the first device is marked as uncorrelated with each of the plurality of second devices included in the device database 216. In other words, an alternate representation of the first device in the remaining plurality of subdomains is not currently discovered. For example, it may be established that neither the device 120*b* nor the device 120*c* are alternate representations of the device 120*a* in the respective subdomains, i.e., the subdomain 118*b* and the subdomain 118*c*.

By way of an example of the above method, a first plugin (for example, the plugin 122*a*) may be an AWS Cloud Plugin and a second plugin (for example, the plugin 122*b*) may be a BES Agent Plugin. The BES Agent Plugin may be the common master plugin or one of the plurality of plugins. The AWS Cloud Plugin may report devices discovered by it and identified uniquely by a VID associated with each of the devices. Correlation keys associated with a first device (for example, the device 120*a*) sent by the AWS Plugin to the server 102 may be a configuration JavaScript Object Notation (JSON), as depicted below:

```
{
"correlation_key": { "site": "BES Cloud", "analysis": 111, "property": 222 },
"correlated_key": { "site": "BES Cloud", "analysis": 333, "property": 444 },
}
where,
'Site' may include a collection of analyses (for example, BES Cloud, containing properties required to manage Cloud devices),
'Analysis' may include a collection of properties (for example, "Hardware properties of Cloud devices"), and
'Property' may include a single device characteristic (for example, MAC address, CPU, VID, etc.)
```

A combination of 'Site', 'Analysis', and 'Property' may completely identify a device characteristic in BigFix™. It may be noted that the set of device properties may include each of the 'Site', the 'Analysis', and the 'Property'. For products other than BigFix™, the set of device properties may be identified through a different structure that is required to be reflected in each of the correlation key (for example, the correlation key associated with the device 120*a*) and the correlated key (for example, the correlation key associated with the device 120*b*). In the example above, the correlation key may include a set of device properties from the AWS Cloud Plugin and the correlated key may include a set of device properties from the BES Agent Plugin.

The server 102 may selectively correlate the correlation key with the correlated key. The AWS Cloud Plugin may report two devices—device A and device B. For each of the device A and the device B, the AWS Cloud Plugin may report the 'Property' as 222, the 'Analysis' as 111, and the 'Site' as BES Cloud, which represent correlation keys for the device A and the device B. In particular, the 'Property' for the device A is reported as "aaabbb", while the 'Property' for the device B is reported as "cccddd".

Further, the BES Agent Plugin may report a correlated key for a device C. The 'Property' of the device C is reported as 444, the 'Analysis' as 333, and the 'Site' as BES Cloud in the correlated key. In particular, the 'Property' for the device C is reported as "cccddd". Further, the server 102 may match "cccddd" from the correlation key associated with the device B with "cccddd" from the correlated key associated with the device C. Thus, the server 102 may establish that the device B and the device C are a single device and thus should be correlated and managed accordingly.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
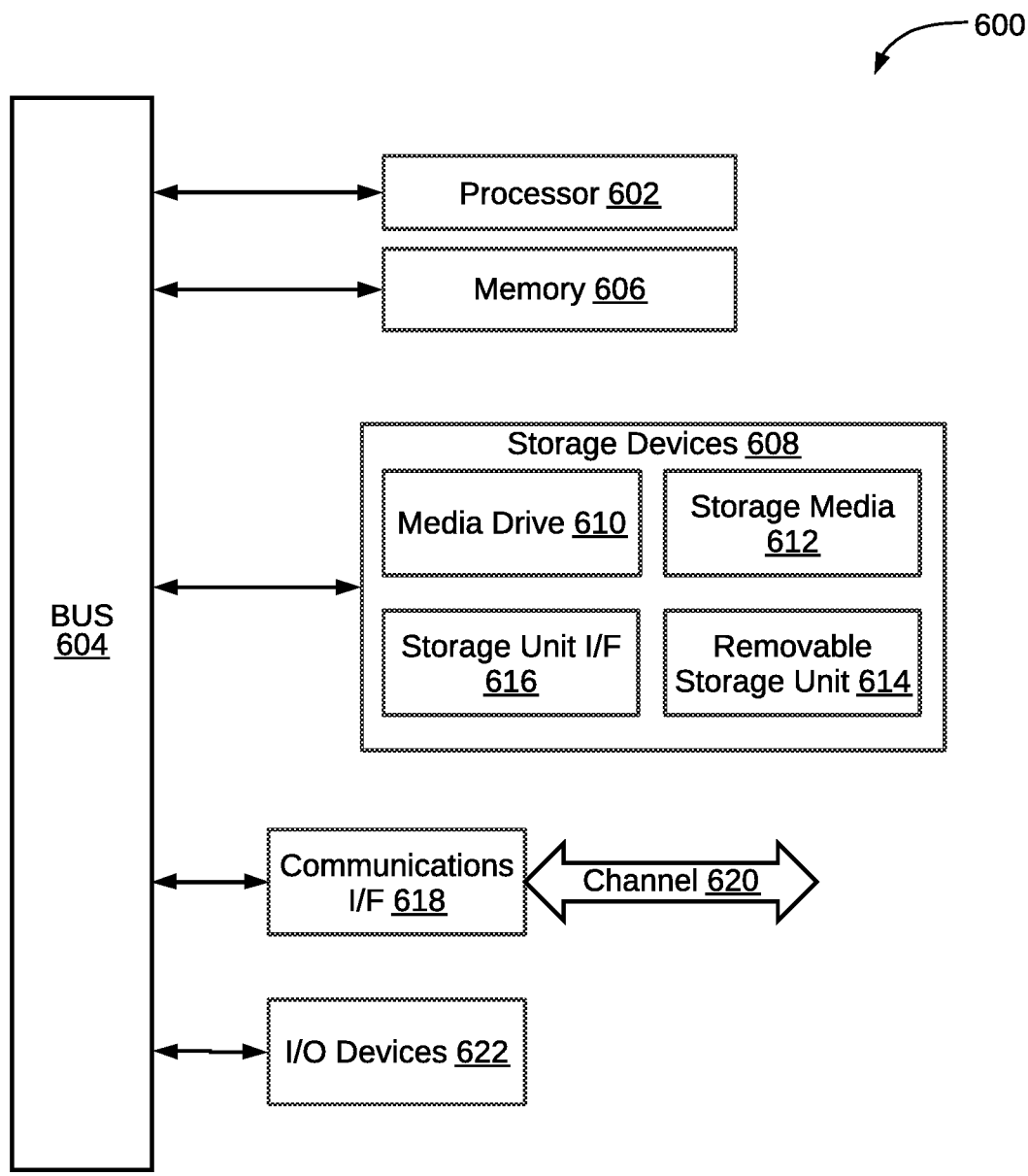
FIG. 6 is a block diagram of a computing system that may be employed to implement processing functionality for various embodiments.

The disclosed methods and systems may be implemented on a conventional or a general-purpose computer system, such as a personal computer (PC) or server computer. Referring now to FIG. 6, an exemplary computing system 100 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 600 may represent, for example, a user device such as a desktop, a laptop, a mobile phone, personal entertainment device, DVR, and so on, or any other type of special or general-purpose computing device as may be desirable or appropriate for a given application or environment. The computing system 600 may include one or more processors, such as a processor 602 that may be implemented using a general or special purpose processing engine such as, for example, a microprocessor, microcontroller or other control logic. In this example, the processor 602 is connected to a bus 604 or other communication medium. In some embodiments, the processor 602 may be an Artificial Intelligence (AI) processor, which may be implemented as a Tensor Processing Unit (TPU), or a graphical processor unit, or a custom programmable solution Field-Programmable Gate Array (FPGA).

The computing system 600 may also include a memory 606 (main memory), for example, Random Access Memory (RAM) or other dynamic memory, for storing information and instructions to be executed by the processor 602. The memory 606 also may be used for storing temporary variables or other intermediate information during execution of instructions to be executed by the processor 602. The computing system 600 may likewise include a read only memory ("ROM") or other static storage device coupled to bus 604 for storing static information and instructions for the processor 102.

The computing system 600 may also include a storage devices 608, which may include, for example, a media drive 610 and a removable storage interface. The media drive 610 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 612 may include, for example, a hard disk, magnetic tape, flash drive, or other fixed or removable medium that is read by and written to by the media drive 610. As these examples illustrate, the storage media 612 may include a computer-readable storage medium having stored therein particular computer software or data.

In alternative embodiments, the storage devices 608 may include other similar instrumentalities for allowing computer programs or other instructions or data to be loaded into the computing system 600. Such instrumentalities may include, for example, a removable storage unit 614 and a storage unit interface 616, such as a program cartridge and cartridge interface, a removable memory (for example, a flash memory or other removable memory module) and memory slot, and other removable storage units and interfaces that allow software and data to be transferred from the removable storage unit 614 to the computing system 600.

The computing system 600 may also include a communications interface 618. The communications interface 618 may be used to allow software and data to be transferred between the computing system 600 and external devices. Examples of the communications interface 618 may include a network interface (such as an Ethernet or other NIC card), a communications port (such as for example, a USB port, a micro USB port), Near field Communication (NFC), etc. Software and data transferred via the communications interface 618 are in the form of signals which may be electronic, electromagnetic, optical, or other signals capable of being received by the communications interface 618. These signals are provided to the communications interface 618 via a channel 620. The channel 620 may carry signals and may be implemented using a wireless medium, wire or cable, fiber optics, or other communications medium. Some examples of the channel 620 may include a phone line, a cellular phone link, an RF link, a Bluetooth link, a network interface, a local or wide area network, and other communications channels.

The computing system 600 may further include Input/Output (I/O) devices 622. Examples may include, but are not limited to a display, keypad, microphone, audio speakers, vibrating motor, LED lights, etc. The I/O devices 622 may receive input from a user and also display an output of the computation performed by the processor 602. In this document, the terms "computer program product" and "computer-readable medium" may be used generally to refer to media such as, for example, the memory 606, the storage devices 608, the removable storage unit 614, or signal(s) on the channel 620. These and other forms of computer-readable media may be involved in providing one or more sequences of one or more instructions to the processor 602 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into the computing system 600 using, for example, the removable storage unit 614, the media drive 610 or the communications interface 618. The control logic (in this example, software instructions or computer program code), when executed by the processor 602, causes the processor 602 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The present disclosure relates to correlating multiple device entries within a domain. The present disclosure provides for using a first correlation key corresponding to a first device in the domain to correlate the multiple device entries. The first correlation key may include a set of device properties. The set of device properties may further include a unique device property that is unique to the first device. The domain may include a plurality of subdomains. The first device may be connected with a first subdomain from the plurality of subdomains through a first plugin. The first plugin may send the first correlation key to a server over a network. The server may match the unique device property in the first correlation key with a unique device property in a second correlation key stored in a device database. When the unique device property in the first correlation key matches with the unique device property in the second correlation key, the server may correlate the first device with the second device mapped to second correlation key in the device database. The server may establish that the second device is a representation of the first device in a second subdomain from the plurality of subdomains. Further, the first device and the second device may be represented as a single device entry in a UI of the server.

As will be appreciated by those skilled in the art, the techniques described in the various embodiments discussed above are not routine, or conventional, or well understood in the art. The techniques discussed above provide for correlating multiple device entries within a domain. The techniques employ a correlation key associated with a device in the domain in order to achieve the same. The correlation key includes a unique device property that is unique to the device. The correlation key is sent to a server through a plugin associated with the device. Use of correlation keys for correlating multiple device entries within a domain has a 100% accuracy and thus the need for the customer verification is not required. Moreover, in contrast to the conventional techniques, the customer may not be required to "uncorrelate" erroneously correlated devices or to manually correlated devices.

The specification has described a method and system for correlating multiple device entries within a domain. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A method for correlating multiple device entries within a domain, the method comprising:
  receiving, by a correlation device, a first correlation key comprising a first set of device properties associated with a first device from a first plugin, wherein the first plugin corresponds to a first subdomain from a plurality of subdomains within the domain, and wherein the first set of device properties comprises a unique device property that is unique to the first device;
  comparing, by the correlation device, the first correlation key with each of a plurality of second correlation keys stored in a device database, wherein the plurality of second correlation keys were received from a plurality of second plugins for a plurality of second devices, and wherein each of the plurality of second correlation keys corresponds to one of the plurality of second plugins and a unique second device from the plurality of second devices, and wherein the comparing comprises matching the unique device property in the first correlation key with at least one device property in each of the plurality of second correlation keys;
  dynamically determining, by the correlation device, a single property belonging to different subdomains of the plurality of subdomains within the domain, based on the matching of the unique device property configured in the first device belonging to the first subdomain and the at least one device property of a second device from the plurality of second devices belonging to a second subdomain of the plurality of subdomains; and
  selectively correlating, by the correlation device, the first device with the second device to uniquely identify a device with the multiple device entries within the domain, based on the determining, wherein the second device is a representation of the first device in the second subdomain from the plurality of subdomains.

2. The method of claim 1, further comprising creating the device database comprising the plurality of second correlation keys, wherein each of the plurality of second correlation keys is mapped to a unique second device of the plurality of second devices and a second plugin of the plurality of second plugins.

3. The method of claim 2, wherein creating the device database comprises:
  receiving a second correlation key of the plurality of second correlation keys from a second plugin of the plurality of second plugins, wherein the second correlation key is sent by the second plugin on discovering a second device of the plurality of second devices, and wherein the second correlation key is associated with the second device;

storing the second correlation key in the device database; and mapping the second correlation key with the second plugin and the second device in the device database.

4. The method of claim 1, wherein determining whether the second correlation key corresponds to the first device comprises: establishing that the second correlation key corresponds to the first device, when the unique device property in the first correlation key matches with a unique device property in the second correlation key; and establishing that the second correlation key does not correspond to the first device, when the unique device property in the first correlation key does not match with the unique device property in the second correlation key.

5. The method of claim 4, wherein selectively correlating comprises:
storing the first correlation key in the device database; and
correlating the first device with the second device mapped to second correlation key in the device database, when the second correlation key corresponds to the first device.

6. The method of claim 4, wherein selectively correlating comprises:
storing the first correlation key in the device database;
creating a mapping of the first correlation key with the first device and the first plugin with no correlation established with the second correlation key; and
marking the first device as uncorrelated with each of the plurality of second devices included in the device database, wherein an alternate representation of the first device in the remaining plurality of subdomains is not currently discovered.

7. A system for correlating multiple device entries within a domain, the system comprising:
a processor; and
a memory communicatively coupled to the processor, wherein the memory stores processor instructions, which when executed by the processor, cause the processor to:
receive a first correlation key comprising a set of device properties associated with a first device from a first plugin, wherein the first plugin corresponds to a first subdomain from a plurality of subdomains within the domain, and wherein the first set of device properties comprises a unique device property that is unique to the first device;
compare the first correlation key with each of a plurality of second correlation keys stored in a device database, wherein the plurality of second correlation keys were received from a plurality of second plugins for a plurality of second devices, and wherein each of the plurality of second correlation keys corresponds to one of the plurality of second plugins and a unique second device from the plurality of second devices and wherein the comparing comprises matching the unique device property in the first correlation key with at least one device property in each of the plurality of second correlation keys;
dynamically determine a single property belonging to different subdomains of the plurality of subdomains within the domain, based on the matching of the unique device property configured in the first device belonging to the first subdomain and the at least one device property of a second device from the plurality of second devices belonging to a second subdomain of the plurality of subdomains; and
selectively correlate the first device with the second device to uniquely identify a device with the multiple device entries within the domain, based on the determining, wherein the second device is a representation of the first device in the second subdomain from the plurality of subdomain.

8. The system of claim 7, wherein the processor instructions, on execution, further cause the processor to create the device database comprising the plurality of second correlation keys, wherein each of the plurality of second correlation keys is mapped to a unique second device of the plurality of second devices and a second plugin of the plurality of second plugins.

9. The system of claim 8, wherein to create the device database, the processor instructions, on execution, further cause the processor to:
receive a second correlation key of the plurality of second correlation keys from a second plugin of the plurality of second plugins, wherein the second correlation key is sent by the second plugin on discovering a second device of the plurality of second devices, and wherein the second correlation key is associated with the second device; store the second correlation key in the device database; and
map the second correlation key with the second plugin and the second device in the device database.

10. The system of claim 7, wherein to determine whether the second correlation key corresponds to the first device, the processor instructions, on execution, further cause the processor to: establish that the second correlation key corresponds to the first device, when the unique device property in the first correlation key matches with a unique device property in the second correlation key; and establish that the second correlation key does not correspond to the first device, when the unique device property in the first correlation key does not match with the unique device property in the second correlation key.

11. The system of claim 10, wherein to selectively correlate, the processor instructions, on execution, further cause the processor to:
store the first correlation key in the device database; and
correlate the first device with the second device mapped to second correlation key in the device database, when the second correlation key corresponds to the first device.

12. The system of claim 10, wherein to selectively correlate, the processor instructions, on execution, further cause the processor to:
store the first correlation key in the device database;
create a mapping of the first correlation key with the first device and the first plugin with no correlation established with the second correlation key; and
mark the first device as uncorrelated with each of the plurality of second devices included in the device database, wherein an alternate representation of the first device in the remaining plurality of subdomains is not currently discovered.

13. A non-transitory computer-readable medium storing computer- executable instructions for correlating multiple device entries within a domain, the computer-executable instructions configured for:

receiving a first correlation key comprising a set of device properties associated with a first device from a first plugin, wherein the first plugin corresponds to a first subdomain from a plurality of subdomains within the domain, and wherein the first set of device properties comprises a unique device property that is unique to the first device;

comparing the first correlation key with each of a plurality of second correlation keys stored in a device database, wherein the plurality of second correlation keys were received from a plurality of second plugins for a plurality of second devices, and wherein each of the plurality of second correlation keys corresponds to one of the plurality of second plugins and a unique second device from the plurality of second devices, and wherein the comparing comprises matching the unique device property in the first correlation key with at least one device property in each of the plurality of second correlation keys;

dynamically determining a single property belonging to different subdomains of the plurality of subdomains within the domain, based on the matching of the unique device property configured in the first device belonging to the first subdomain and the at least one device property of a second device from the plurality of second devices belonging to a second subdomain of the plurality of subdomains; and selectively correlating the first device with the second device to uniquely identify a device with the multiple device entries within the domain, based on the determining, wherein the second device is a representation of the first device in the second subdomain from the plurality of subdomains.

14. The non-transitory computer-readable medium of claim 13, wherein the computer-executable instructions are further configured for creating the device database comprising the plurality of second correlation keys, wherein each of the plurality of second correlation keys is mapped to a unique second device of the plurality of second devices and a second plugin of the plurality of second plugins.

15. The non-transitory computer-readable medium of claim 13, wherein for determining whether the second correlation key corresponds to the first device, the computer-executable instructions are further configured for: establishing that the second correlation key corresponds to the first device, when the unique device property in the first correlation key matches with a unique device property in the second correlation key; and establishing that the second correlation key does not correspond to the first device, when the unique device property in the first correlation key does not match with the unique device property in the second correlation key.

16. The non-transitory computer-readable medium of claim 15, wherein for selectively correlating, the computer-executable instructions are further configured for:

storing the first correlation key in the device database; and correlating the first device with the second device mapped to second correlation key in the device database, when the second correlation key corresponds to the first device.

17. The non-transitory computer-readable medium of claim 15, wherein for selectively correlating, wherein the computer-executable instructions are further configured for:

storing the first correlation key in the device database;

creating a mapping of the first correlation key with the first device and the first plugin with no correlation established with the second correlation key; and marking the first device as uncorrelated with each of the plurality of second devices included in the device database, wherein an alternate representation of the first device in the remaining plurality of subdomains is not currently discovered.

* * * * *